United States Patent
Hsu et al.

(10) Patent No.: US 8,391,122 B2
(45) Date of Patent: *Mar. 5, 2013

(54) SYSTEM AND METHOD FOR ENABLING EFFICIENT SMALL WRITES TO WORM STORAGE

(75) Inventors: Windsor Wee Sun Hsu, San Jose, CA (US); Lan Huang, Sunnyvale, CA (US); Michael A. Ko, San Jose, CA (US); Shauchi Ong, San Jose, CA (US)

(73) Assignee: International Business Machines Corporation, Armonk, NY (US)

( * ) Notice: Subject to any disclaimer, the term of this patent is extended or adjusted under 35 U.S.C. 154(b) by 645 days.

This patent is subject to a terminal disclaimer.

(21) Appl. No.: 12/334,280

(22) Filed: Dec. 12, 2008

(65) Prior Publication Data

US 2009/0141619 A1 Jun. 4, 2009

Related U.S. Application Data

(63) Continuation of application No. 10/906,352, filed on Feb. 15, 2005, now Pat. No. 7,512,044.

(51) Int. Cl.
*G11B 7/24* (2006.01)
(52) U.S. Cl. .................................................. 369/275.3
(58) Field of Classification Search .......................... None
See application file for complete search history.

(56) References Cited

U.S. PATENT DOCUMENTS

| | | | |
|---|---|---|---|
| 4,807,205 A * | 2/1989 | Picard | 369/30.09 |
| 6,343,341 B1 * | 1/2002 | Cabrera et al. | 711/111 |
| 6,377,526 B1 | 4/2002 | Vining et al. | |
| 7,512,044 B2 * | 3/2009 | Hsu et al. | 369/53.1 |
| 2003/0167439 A1 * | 9/2003 | Talagala et al. | 714/770 |
| 2005/0068900 A1 * | 3/2005 | Stephens et al. | 370/252 |
| 2005/0149817 A1 * | 7/2005 | Biran et al. | 714/758 |
| 2005/0251695 A1 * | 11/2005 | Jaquette et al. | 713/194 |
| 2006/0083138 A1 | 4/2006 | Kubo | |
| 2006/0095687 A1 * | 5/2006 | Hsu et al. | 711/152 |

OTHER PUBLICATIONS

U.S. Non-Final Office Action for U.S. Appl. No. 10/906,352 mailed May 14, 2008.
U.S. Notice of Allowance for U.S. Appl. No. 10/906,352 mailed Sep. 30, 2008.

* cited by examiner

*Primary Examiner* — Joseph Feild
*Assistant Examiner* — Henok Heyi
(74) *Attorney, Agent, or Firm* — Kenneth L. Sherman, Esq.; Michael Zarrabian, Esq.; Sherman & Zarrabian LLP

(57) ABSTRACT

According to the present invention, there is provided a method of providing a WORM storage system, the method including a sector-append capability. The method includes receiving data to be written to a WORM storage system. In addition, the method includes identifying a target sector at which the data is to be written. Also, the method includes determining if the received data can be added to the target sector. Moreover, the method includes adding the received data to the target sector if it is determined that the received data can be added to the target sector.

28 Claims, 6 Drawing Sheets

SYSTEM AND METHOD FOR ENABLING EFFICIENT SMALL WRITES TO WORM STORAGE

CROSS-REFERENCE TO RELATED APPLICATIONS

This application is a continuation of patent application Ser. No. 10/906,352 titled System and Method for Enabling Efficient Small Writes to WORM Storage, filed on Feb. 15, 2005.

FIELD OF THE INVENTION

The present invention relates generally to WORM storage, and, in particular, to enabling efficient small writes to a WORM storage system.

BACKGROUND OF THE INVENTION

As critical records (data objects) are increasingly stored in electronic form, it is imperative that they be stored reliably and in a tamper-proof manner. Furthermore, a growing subset of electronic records (e.g., electronic mail, instant messages, drug development logs, medical records, etc.) is subject to regulations governing their long-term retention and availability. Non-compliance with applicable regulations may incur severe penalty under some of the rules. The key requirement in many such regulations (e.g. SEC rule 17a-4) is that the records must be stored reliably in non-erasable, non-rewritable storage such that the records once written, cannot be altered or overwritten. Such storage is commonly referred to as WORM (Write-Once Read-Many) storage as opposed to rewritable or WMRM (Write-Many Read-Many) storage, which can be written many times.

In addition, the data must be organized such that all of the data relevant to an inquiry can be promptly discovered and retrieved, typically within days and sometimes even within hours. With the large volume of data today, scanning all of the data stored to discover those that are relevant to an inquiry is no longer practical. Instead, the data must be organized with some form of direct access mechanism such as an index, and the index must be stored in WORM storage to ensure that it cannot be altered or overwritten. In many cases, indexing and organizing the data requires maintaining metadata that has to be updated or incrementally added as data is written to the system. This means that there is often a need to write small amounts of data to WORM storage. Other critical applications, such as maintaining a non-alterable audit trail of the activity in the system, also write data to WORM storage in small amounts.

Traditional WORM storage, however, has a minimum write unit called the sector that is typically 512 bytes (B). Writing a small amount of data to such storage would use up at least one sector of storage and waste a lot of storage space. In addition, the data would be spread out across many sectors, thereby decreasing locality of reference and access performance.

Furthermore, many traditional WORM storage such as CD-R lacks the ability to write an arbitrary sector on the media. Instead, sectors have to be written in order or a large collection of sequential sectors have to be written all at once. In such cases, the indexing has to be performed at one go on a large collection of data (e.g., when a CD-R is closed) and once the indexing is done, new data cannot be added to the index. This means that the index is not available until after the entire collection of data is stored. As data is added over a period of time, the system would create many indices, each of which may need to be searched to find a particular piece of data.

What is therefore needed is a way to enable efficient small writes to WORM storage.

SUMMARY OF THE INVENTION

According to the present invention, there is provided a method of providing a WORM storage system, the method including a sector-append capability. The method includes receiving data to be written to a WORM storage system. In addition, the method includes identifying a target sector at which the data is to be written. Also, the method includes determining if the received data can be added to the target sector. Moreover, the method includes adding the received data to the target sector if it is determined that the received data can be added to the target sector.

DETAILED DESCRIPTION

The invention will be described primarily as a system and method for providing sector-append capability in a WORM storage system. In the following description, for purposes of explanation, numerous specific details are set forth in order to provide a thorough understanding of the present invention. It will be evident, however, to one skilled in the art that the present invention may be practiced without these specific details.

Those skilled in the art will recognize that an apparatus, such as a data processing system, including a CPU, memory, I/O, program storage, a connecting bus and other appropriate components could be programmed or otherwise designed to facilitate the practice of the invention. Such a system would include appropriate program means for executing the operations of the invention.

An article of manufacture, such as a pre-recorded disk or other similar computer program product for use with a data processing system, could include a storage medium and program means recorded thereon for directing the data processing system to facilitate the practice of the method of the invention. Such apparatus and articles of manufacture also fall within the spirit and scope of the invention.

Figure 1:
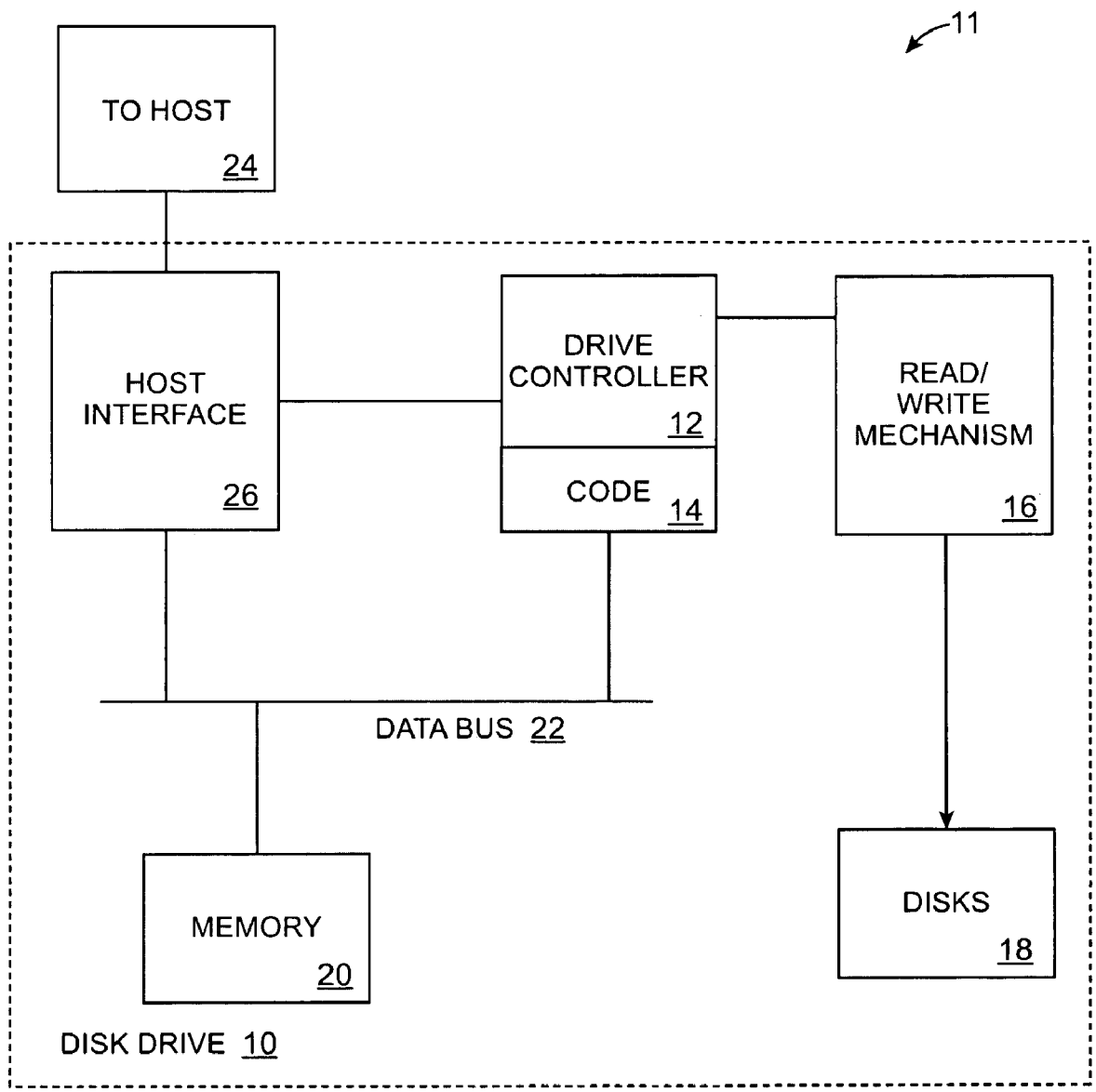
FIG. 1 is a block diagram of a non-limiting storage device shown implemented as a disk drive.

Referring initially to FIG. 1, an illustrative non-limiting data storage device is shown implemented as a disk drive 10.

Figure 2:
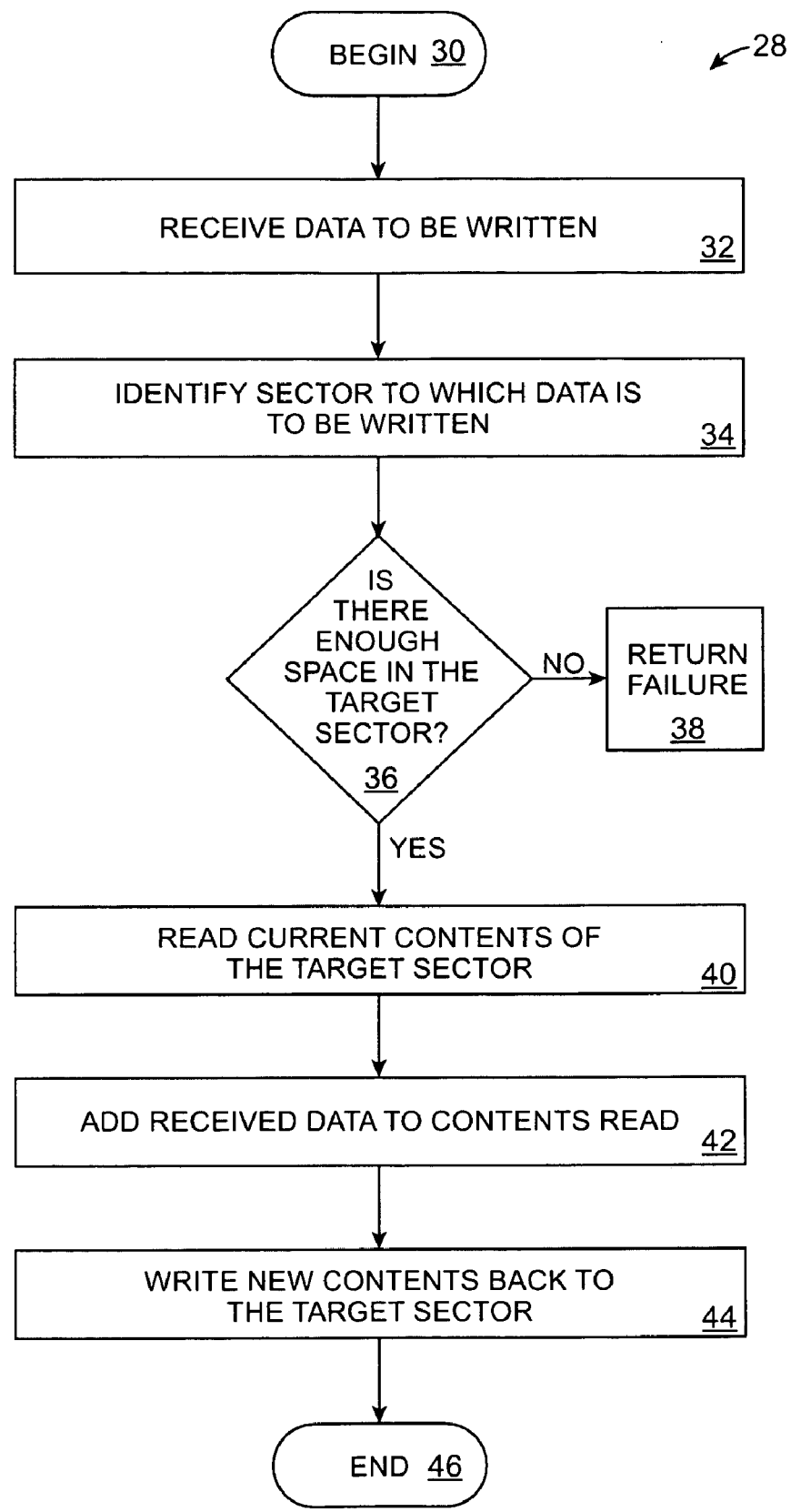
FIG. 2 is a flowchart of logic associated with adding data to a sector in a WORM storage system, according to an exemplary embodiment of the invention.

The non-limiting drive 10 shown in FIG. 2 has a housing 11 holding a disk drive controller 12 that can include and/or be implanted by a microcontroller. The controller 12 may access electronic data storage in a computer program device or product such as but not limited to a microcode storage 14 that may be implemented by a solid state memory device. The microcode storage 14 can store microcode embodying logic.

The controller 12 controls a read/write mechanism 16 that includes one or more heads for writing data onto one or more disks 18. Non-limiting implementations of the drive 10 include plural heads and plural disks 18, and each head is associated with a respective read element for, among other things, reading data on the disks 18 and a respective write element for writing data onto the disks 18. The disk 18 may include plural data sectors. More generally, as used below, the term "sector" refers to a unit of data that is written to the storage device, which may be a fixed size. The storage device can allow random access to any sector.

If desired, the controller 12 may also communicate with one or more solid state memories 20 such as a Dynamic Random Access Memory (DRAM) device or a flash memory device over an internal bus 22. The controller 12 can also communicate with an external host computer 24 through a host interface module 26 in accordance with principles known in the art.

The invention provides for adding data to an arbitrary sector within a WORM storage system. When data is to be written to a blank sector, the system writes the data into the sector and remembers how much data has been stored in that sector. On a subsequent write to that sector, the system first checks to see if there is sufficient space left in that sector to hold the new data. If so, it adds the new data to the data already in the sector and remembers the new length of data in the sector. Otherwise, it rejects the write. On a query of the sector, the system gives an indication of the amount of data stored in the sector.

In one embodiment, the invention operates by enforcing write-once semantics on random access WMRM storage, such as disk drive 10 or arrays of disk drive 10. For instance, the invention maintains some state to indicate which portions of the storage have already been written and then checking the state before performing any write. As is the case with WORM storage, WMRM storage has a minimum write unit but because WMRM storage allows rewrites, the system can read a sector that has already been written, add data to it, and then write it again. This means that the system can effectively add data to a sector.

FIG. 2 is a method 28 of logic associated with adding data to a sector in a WORM storage system, according to an exemplary embodiment of the invention. At block 30, method 28 begins.

At block 32, data to be added to a sector is received.

At block 34, the sector to which the data is to be added is identified.

At block 36, a determination is made as to whether there is enough space in the identified target sector to add the received data. If no, there is not enough space, then at block 38, a failure is returned.

If yes, there is enough space, then at block 40, the contents of the target sector, i.e. the data that is currently stored in that sector, are read.

At block 42, the received data is added to the contents read from the target sector to form the new contents which is then written back to the target sector at block 44.

At block 46, method 28 ends.

With regards to method 28 in FIG. 2, if the target sector is determined to be empty, the system can skip the read of the current contents. Also, as in an alternative embodiment, an optional final step to method 28 can be included, where the contents of the target sector are read back and verified to ensure that the received data have been successfully stored. If a discrepancy is detected, the system retries the corresponding operations and re-verifies that they have been successfully carried out. After a predetermined number of re-tries, the system returns a failure.

In an alternate embodiment, at block 42, the current contents of the target sector are matched against the received data. If the current contents is not a prefix or suffix of the received data, the system returns a failure. Otherwise, the system writes the received data back to the target sector.

Upon receiving a read request such as a read (target sector A) command, the system reads the contents of the target sector A and returns the contents to the requestor.

In a further embodiment, the system maintains state for each sector to indicate the amount of data already stored in that sector. Such state could take the form of the offset into the sector at which new data can be written. This recorded value will be referred to as the length field of the sector. Direct access to the length field is restricted so that once data has been added to a sector, the data is protected from change. For instance, the length information is stored in a non-user-addressable non-volatile memory or non-user-addressable portion of the WMRM storage.

On initialization of the WORM storage system, the length field for all sectors are set to zero, indicating that the corresponding sectors are empty. Typically, the state initialization is performed only once in the factory. Subsequently, the only mechanism available to update the length is to increase its length during a write of the corresponding block. Alternatively, the length field of a sector may be reinitialized after a predetermined period of time such as the desired retention period of the data stored.

With regards to method 28 in FIG. 2, to make the determination of whether there is enough space in the target sector to add the received data (block 36), the system first reads the length field corresponding to the target sector and compares that to the amount of received data. At block 42, the system inserts the received data into the contents read from the target sector at an offset equal to the value of the length field. At block 44, the system writes the new contents back to the target sector and increases the length field by an amount corresponding to the data inserted at block 42.

Upon receiving a read request such as a read (target sector A) command, the system first determines l, the value of the length field associated with the target sector A. Next it reads the target sector A and returns the first l bytes of the data read and, optionally, l.

In a preferred embodiment, the data received by the WORM storage device includes the current contents of the target sector. This is useful in situations where an application keeps the last block (sector) of an object (e.g., a log or journal) in memory. Whenever the application appends data to the object, it can simply issue a write of the last sector with a new byte count.

Figure 3:
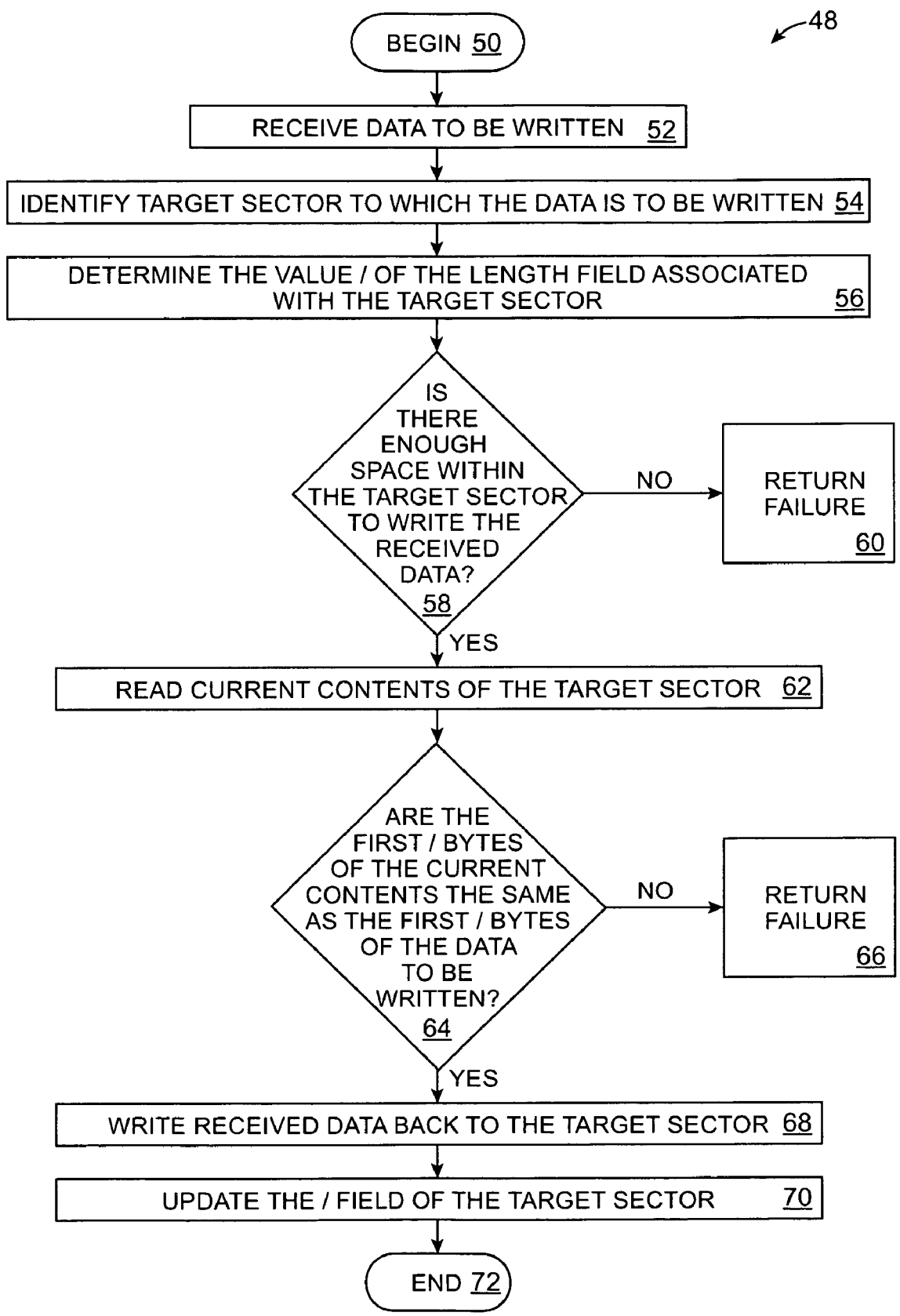
FIG. 3 is a flowchart of logic associated with adding data to a target sector in a WORM storage system wherein the data received by the WORM storage system includes the contents of the target sector, according to an exemplary embodiment of the invention.

FIG. 3 is a method 48 of adding data to a target sector in a WORM storage system wherein the data received by the WORM storage system includes the current contents of the target sector, according to an exemplary embodiment of the invention. At block 50, method 48 begins.

At block 52, b bytes of data to be written to a sector in a WORM storage system are received. For example, a write command such as "write(target sector A, data D, byte count b)" might be received.

At block 54, the target sector to which the data is to be written is identified.

At block 56, l, the value of the length field associated with the target sector, is determined.

At block 58, a determination is made as to whether there is enough space within the target sector to write the received data. If not, then at block 60 a failure is returned. If yes, then at block 62, the current contents of the target sector are read.

At block 64, a determination is made as to whether the first l bytes of the current contents match the first l bytes of the data to be written. If not, then at block 66, a failure is returned. If yes, then at block 68 the received data is written back to the target sector.

At block 70, the length field of the target sector is updated to b.

At block 72, method 48 ends.

To reduce the chances that the length information could be corrupted and the WORM property circumvented, checksums or some other mathematical function of the lengths are maintained. The checksums or some other mathematical function of the lengths are stored securely, for example, in a non-user-addressable non-volatile memory or non-user-addressable portion of the WMRM storage.

Figure 4:
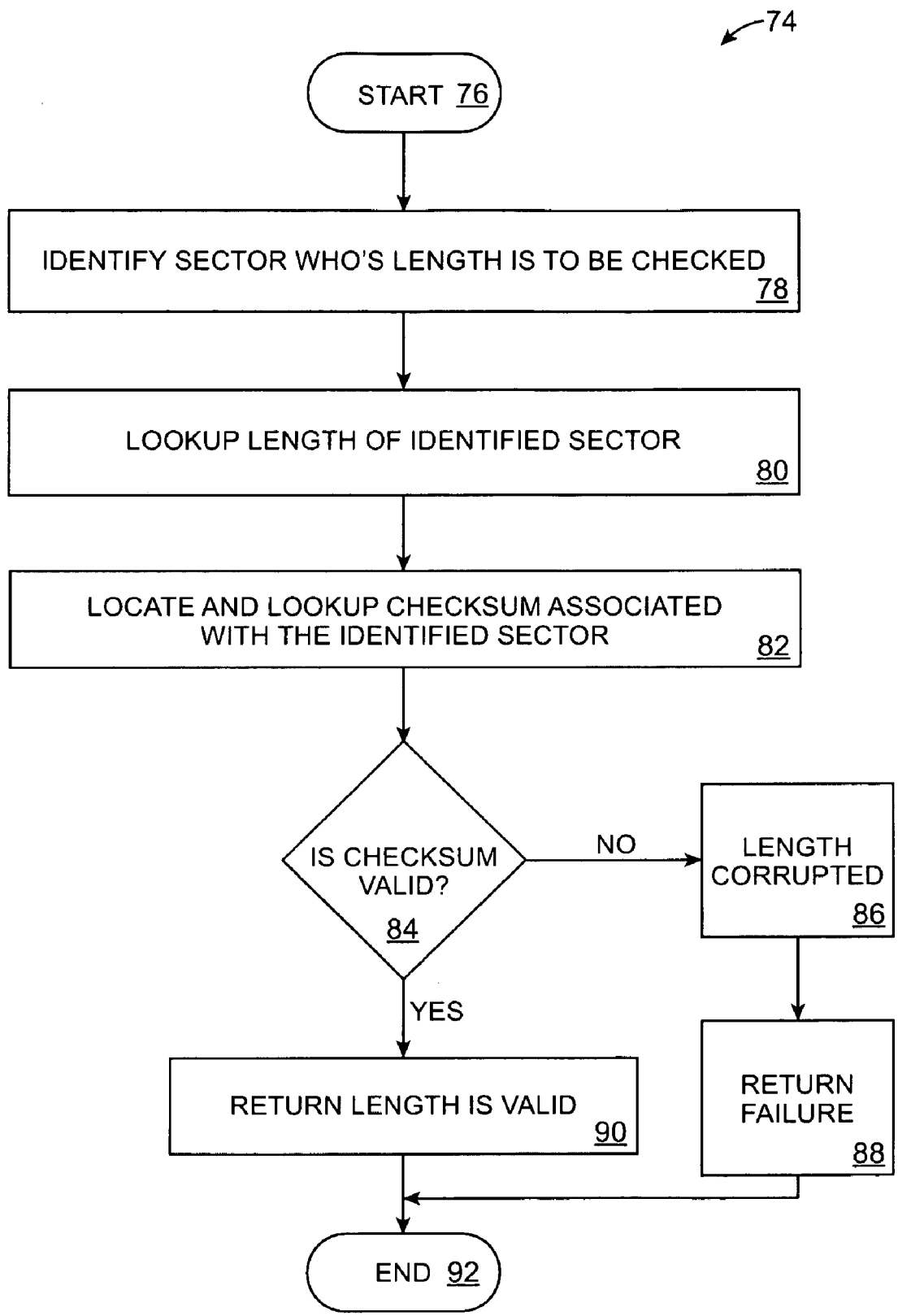
FIG. 4 is a flowchart of logic associated with verifying the validity of the length information, according to an exemplary embodiment of the invention.

FIG. 4 is a flowchart of logic associated with verifying the validity of the length information, according to an exemplary embodiment of the invention. At block 76, method 74 begins.

At block 78, a sector whose length information is to be verified is identified. In one embodiment, successful verification of the length information is required before the sector can be written. In another embodiment, length information verification of a sector is performed every time the information is read.

At block 80, a lookup is performed to determine the identified sector's length.

At block 82, the checksum or mathematical function associated with the sector is identified and retrieved.

At block 84, a determination is made as to whether the checksum is valid. The determination can be performed by recomputing the checksum based on the retrieved length, and comparing the recomputed checksum with the retrieved checksum. If no, then at block 86, the length information is determined to be corrupted. At block 88, as a result of the determination in block 86, a failure is returned.

Returning to block 84. If yes, then at block 90, the length information of the identified sector is determined to be valid.

At block 92, method 74 ends.

Figure 5:
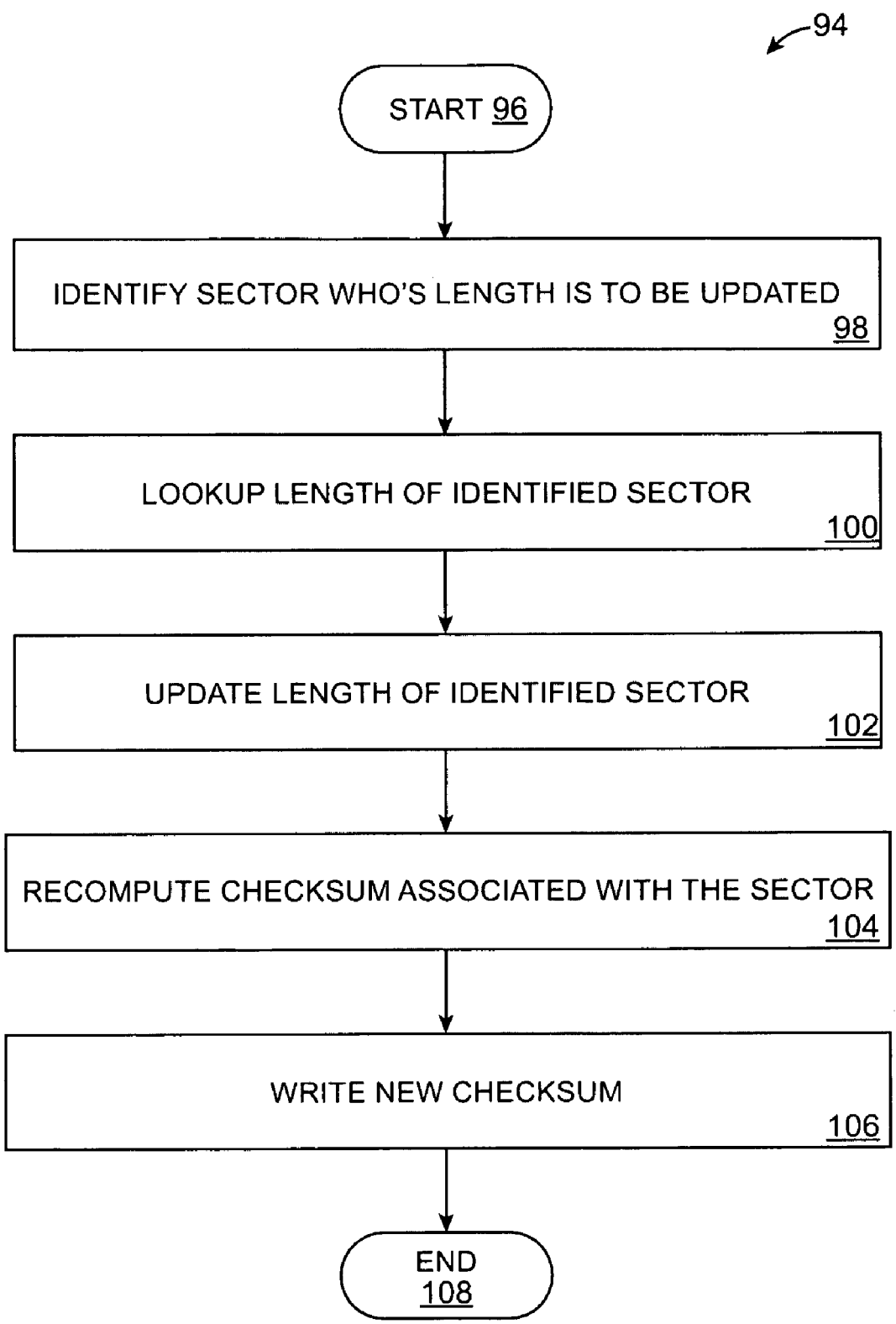
FIG. 5 is a flowchart of logic associated with updating the length information, according to an exemplary embodiment of the invention.

FIG. 5 is a flowchart of logic associated with updating the length information, according to an exemplary embodiment of the invention. At block 96, method 94 begins.

At block 98, a sector whose length information is to be updated is identified.

At block 100, a lookup is performed to determine the identified sector's length.

At block 102, the identified sector's length is updated.

At block 104, the checksum or mathematical function associated with the sector is recomputed based on the updated length.

At block 106, the recomputed checksum is stored.

At block 108, method 94 ends.

In one embodiment, the lengths and checksums are stored in a distributed fashion in the WMRM storage so that the lengths are located close to their corresponding sectors. For example, the first few sectors of a disk cylinder can be used to store the lengths and corresponding checksum for the other sectors in the cylinder. If the disk supports sector sizes that are slightly larger (e.g., 528 B) than the standard 512 B, the length corresponding to each sector can also be stored in the sector together with the data. In one embodiment, the invention is implemented in the disk firmware, which provides for storing the length field in the gap between the sectors.

In one embodiment, a read/write interface that explicitly specifies the byte length of the data is provided for communicating with a WORM storage system. In another embodiment, the byte length of the data can be encoded into the other fields. This is especially desirable if the invention is to be implemented using an existing block (sector) interface. For example, the byte length can be encoded into the last word of the last block in a transfer. If the amount of data to be transferred is a multiple of the block size, then an additional block has to be added to the transfer. Alternatively, the encoding could be such that the last word contains the length only when another field has a certain property. For instance, if the most significant bit of the target sector address is not used, it can be set to one to indicate that the length is in the last word of the last block. The most significant bit of the block count can also be used to indicate that the length is in the last word of the transferred data. If the block count of a transfer is so large that it uses the most significant bit, we split the transfer into two. In yet another alternative, we can set aside a small portion of the storage address space (e.g., sector 0-1023) to act as message buffers. In this case, we would encode the entire request (data, target address, length, etc.) in a contiguous group of sectors within the special range of sectors and issue the requested command with the first sector in the group as the target address.

Figure 6:
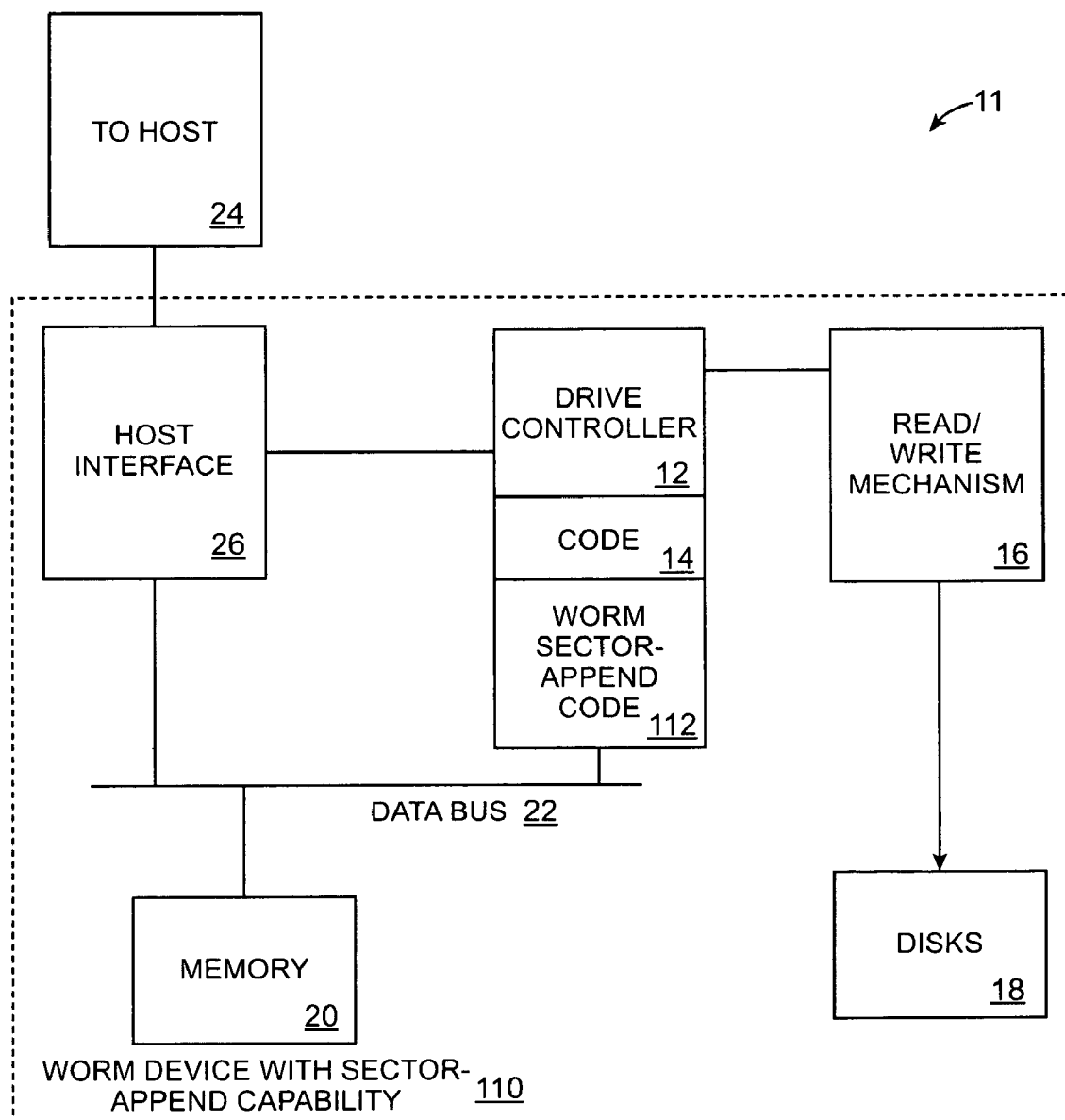
FIG. 6 is a diagram of a WORM device with sector-append capability, according to an exemplary embodiment of the invention.

Many physical embodiments of the invention are possible. FIG. 6 is a diagram of a WORM device with sector-append capability, according to an exemplary embodiment of the invention. In device 110, the invention is implemented as a firmware layer 112. The layer performs the check and update of the length field, and the read-modify-write of the sectors. The combination of firmware layer 112, controller 12 that executes the firmware, read/write mechanism 16 and disks 18 are physically packaged together and sealed so that there is no way to directly access the disk except through the WORM sector-append firmware.

In another preferred embodiment, the invention is implemented in a hardware/software layer on top of an array or arrays of disks. The array could be a RAID array so that all the data stored on the disks, including the length fields, are protected against loss due to disk failures. The layer on top of the array hides the length field and prevents it from being directly accessed.

While the invention has been described as sector append, it should be apparent that invention includes other ways of adding data to the data already in a sector, such as prepending. While the invention has been described using single-sector writes, it should be apparent that the invention also applies in the case where multiple sectors are written at a time. It should also be apparent that the invention can be used to provide storage that is protected from rewrite for a specified period of time after it is written. At the end of the predetermined period, the storage can be rewritten. It should also be apparent that to support concurrent write activity, the system has to ensure that the length check and update operations are performed atomically. It should further be apparent that, while we have described the invention using specific storage devices such as disk drive, the same ideas apply when the WMRM storage is made up of other storage devices/systems (e.g., MRAM, MEMS) or combinations (e.g., arrays) of storage devices/systems.

A system and method for enabling efficient small writes to a WORM storage system has been disclosed. Although the present invention has been described with reference to specific exemplary embodiments, it will be evident that various modifications and changes may be made to these embodiments without departing from the broader spirit and scope of the invention. Accordingly, the specification and drawings are to be regarded in an illustrative rather than a restrictive sense.

What is claimed is:

1. A system comprising:
    a modified WORM storage device including at least one data storage medium defining data sectors, wherein at least one of the data sectors comprising a rewritable sector;
    a length field associated with each of the data sectors comprising length of data associated with each of the data sectors; and
    a mathematical function associated with the length field, wherein the mathematical function is utilized to ensure the integrity of the length field, wherein data is added to the rewritable sector including data written by a first write, via a second write based on the length of data in the rewritable sector from the first write.

2. The system of claim 1 wherein the data storage medium is rewritable.

3. The system of claim 1 wherein the length field is maintained in a nonuser-addressable portion of storage.

4. The system of claim 1 wherein the mathematical function is maintained in a non-user-addressable portion of storage.

5. The system of claim 1 wherein the mathematical function is a checksum.

6. The system of claim 1, further includes:
    a means for receiving data to be written to the modified WORM storage device;
    a means for identifying a target sector at which the data is to be written, wherein the target sector including data written from a first write;
    a means for determining if the received data can be added to the target sector; and
    a means for adding the received data to the target sector.

7. The system of claim 6, further includes:
    a means for identifying a length field associated with the identified target sector; and
    a means for analyzing the identified length field to determine whether there is available space in the target sector to write the received data.

8. The system of 6 wherein adding the received data to the target sector includes writing the received data to the target sector and updating the associated length field.

9. The system of claim 6 wherein determining if the received data can be added to the target sector further includes:
    reading the contents of the target sector; and
    matching the contents of the target sector with a portion of the received data.

10. The system of claim 6 wherein adding the received data to the target sector includes reading the current contents of the target sector, adding the received data to the current contents, and writing the new contents to the target sector.

11. The system of claim 1, further including:
    means for receiving a request for data at a target sector;
    means for reading the contents of the target sector; and
    means for returning the contents of the target sector.

12. The system of claim 11 wherein reading the contents of the target sector include:
    determining the length field of the target sector;
    reading the target sector; and
    selecting, based on the length field, the contents of the target sector from the data read.

13. The system of claim 11 wherein returning the contents of the target sector further includes returning the length field.

14. A method of providing a modified WORM storage system including a rewriteable sector, comprising:
    receiving data to be written to the modified WORM storage system;
    identifying a target sector at which the data is to be written, wherein the target sector including data written by a first write;
    determining if the received data can be added to the target sector based on a length of data in the target sector from the first write; and
    if so, adding the received data to the target sector via a second write.

15. The method of claim 14 wherein determining if the received data can be added to the target sector includes:
    identifying a length field associated with the identified target sector; and
    analyzing the identified length field to determine whether there is available space in the target sector to write the received data in the second write.

16. The method of claim 14 wherein adding the received data to the target sector includes writing the received data to the target sector and updating the associated length field.

17. The method of claim 14 wherein determining if the received data can be added to the target sector further includes:
    reading the contents of the target sector; and
    matching the contents of the target sector with a portion of the received data.

18. The method of claim 14 wherein adding the received data to the target sector includes reading the current contents of the target sector, adding the received data to the current contents, and writing the new contents to the target sector.

19. The method of claim 15 wherein the length field is maintained in a nonuser-addressable portion of storage.

20. The method of claim 15 further includes analyzing a mathematical function associated with the length field to determine if the length field has been corrupted.

21. The method of claim 20 wherein the mathematical function is a checksum.

22. The method of claim 20 wherein the mathematical function is maintained in a non-user-addressable portion of the modified WORM storage.

23. The method of claim 14, further includes:
    receiving a request for data at a target sector;
    reading the contents of the target sector; and
    returning the contents of the target sector.

24. The method of claim 23 wherein reading the contents of the target sector include:
    determining the length field of the target sector;
    reading the target sector; and
    selecting, based on the length field, the contents of the target sector from the data read.

25. The method of claim 23 wherein returning the contents of the target sector further includes returning the length field.

26. A non-transitory computer program product for providing a modified WORM storage system method, comprising:
    a computer program storage device having computer-readable program code embodied therewith, wherein the computer readable program code when executed on the computer causes the computer to perform operations comprising:
        receiving data to be written to the modified WORM storage system, wherein the modified WORM storage system includes a rewriteable sector;

identifying a target sector at which the data is to be written, the target sector including data written in a first write;

determining if the received data can be added to the target sector in addition to the data written by the first write; and adding the received data to the target sector via a second write.

27. A modified WORM storage system, comprising:

a modified WORM storage device including at least one rewritable data storage medium defining data sectors;

a length field associated with each of the data sectors; and a mathematical function associated with the length field, wherein the mathematical function is utilized to ensure the integrity of the length field, wherein at least one data sector includes data from a first write, and data is added to the at least one data sector via a second write based on the length field.

28. A method of providing a modified WORM storage system, including:

receiving data to be written to the modified WORM storage system, wherein the modified WORM storage system including at least one rewriteable sector;

identifying a particular rewritable target sector at which the data is to be written, wherein the target sector including data written from a first write;

determining if the received data can be added to the target sector; and if so, adding the received data to the target sector via a second write.

* * * * *